Nov. 25, 1958   Y. W. TITTERINGTON   2,862,177
APPARATUS FOR MEASURING THE CHARGE ON BURIED CONDUCTORS
Filed Feb. 28, 1955
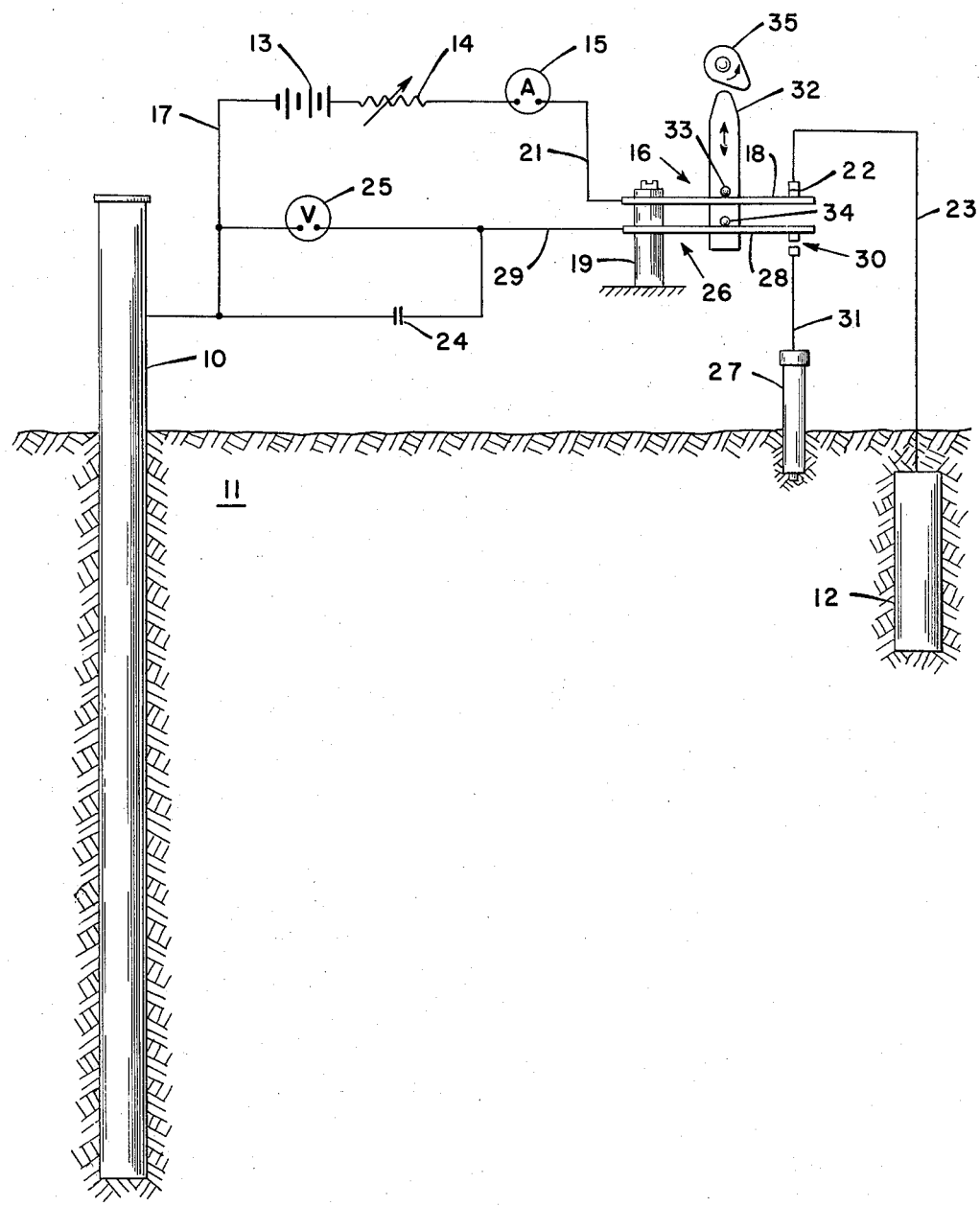

United States Patent Office
2,862,177
Patented Nov. 25, 1958

2,862,177

APPARATUS FOR MEASURING THE CHARGE ON BURIED CONDUCTORS

Yale W. Titterington, Tulsa, Okla.

Application February 28, 1955, Serial No. 490,989

8 Claims. (Cl. 324—29)

This invention relates to an apparatus for measuring the amount of current from an external source necessary to arrest corrosion on a conductor submerged in an electrolyte. More particularly this invention is directed to an apparatus for determining the amount of cathodic protection current required to balance the telluric galvanic and other currents flowing in a metallic well casing and thus prevent corrosion on the external surface of the casing.

Ewing in "Determination of Current Required for Cathodic Protection," Proc. AGA, 613 (1940) and Pearson in "Null Methods Applied to Corrosion Measurements," Trans. Electrochemical Soc., 81, 485–510 (1942), have shown a method by which the amount of current required to protect a well casing from external corrosion can be determined. This method involves the plotting of current-potential curves in which intersecting lines on a plot of the current in the casing-charging or anode circuit versus the potential of the casing to earth with respect to a standard half cell indicate the amount of current which is just sufficient to protect the external surface of the casing from corrosion. The apparatus proposed for producing this plot has been found to be inadequate and inaccurate.

It is therefore an object of this invention to provide an improved apparatus for determining the amount of cathodic current required to prevent external casing corrosion. More particularly it is an object of this invention to provide improved apparatus for obtaining data to plot the current-potential curves using a charge-measuring circuit and a casing charging circuit which are intermittently connected to the casing at close intervals. These and other objects of this invention will become apparent from the following description of the apparatus which is illustrative of the invention. In this description reference will be made to the accompanying drawing which shows a schematic diagram of one embodiment of the invention.

The invention basically is an apparatus for measuring the potential between an electrical conductor such as a metallic well casing and the ground in which the casing is submerged, this potential being determined intermittently while the conductor is in a state of polarization, i. e., before the charge on the conductor has decayed.

Referring now to the drawing for a more detailed description of the invention, the electrical conductor which in this case is represented by a metallic well-casing 10 extends into and is in contact with the earth 11 which is an electrolyte. Due to earth or telluric currents, galvanic current and the like currents flow in this conductor. These currents, perhaps due to dissimilarities in the various joints of the conductor or to inhomogeneities in the earth's substrata, tend to enter the conductor at some points and leave the conductor at other points. Where the currents leave the conductor, the so-called anodic points, the conductor is corroded. This in the case of a well casing is very undesirable due to the formation of pits and eventually holes through the casing and consequent leaking of well fluids into the surrounding earth formations or entry of extraneous fluids into the well. This corrosion is prevented by placing an anode in the earth at a substantial distance and applying sufficient electromotive force to induce a current which will negate or counteract the current flow at all anodic points along the conductor. The anode is typically spaced at a distance of fifty feet or more, preferably at a distance of about 100–300 feet, from the conductor so that the protective or induced currents will be spread out a great distance along the conductor. The anode may be of the same metal as the conductor, in which case an external electromotive force is required to obtain cathodic protection. Alternatively the anode may be a metal more noble or higher in the electromotive series than the conductor, e. g., magnesium, so that when the conductor and the anode are submerged in the same electrolyte, the earth, a current is generated which protects the conductor.

In the present invention which is directed to apparatus for determining the amount of current required to protect the casing 10, the anode 12, which is typically though not necessarily made from the same metal as the conductor, is placed in good electrical contact with the earth 11. For example, the anode may be placed in a salt water pit or it may be merely a stake driven into the ground. The distance between the casing and the anode is preferably greater than fifty feet, and in fact, the anode used in the present apparatus may be the same anode used to protect the casing as described above.

An electrical charging circuit is provided between the casing and the anode. This circuit includes in series a power supply or source of unidirectional current such as a battery 13, a variable resistance 14, an ammeter 15, and a first circuit breaker or switch 16. The battery is connected via line 17 to the casing. The first switch comprises more particularly a cantilever spring 18 anchored at one end to an insulated base 19. The anchored end is connected by line 21 to ammeter 15. One half of the breaker points 22 is attached to the free end of the conducting cantilever spring. The other half of the breaker points is fixed to the base of the switch (not shown) and is electrically connected via line 23 to the anode 12. This complete charging circuit may be low voltage and low amperage, typically 1–110 volts and a maximum of about 10–25 amperes.

In the charge-measuring circuit condenser 24 and volt meter 25 which are connected in parallel are connected via line 17 to the casing 10 and through a second circuit breaker or switch 26 to a standard half cell 27. This standard half cell may be for example any of the commercially available copper-copper sulfate or calomel electrodes. Volt meter 25 is desirably a sensitive vacuum tube volt meter with an internal resistance of 25–100 megohms or higher. Second switch 26 comprises a cantilever spring 28 anchored at one end to insulated base 19. Condenser 24 is connected to this fixed end of the conducting cantilever spring via lead 29. One half of a second set of breaker points 30 is connected to the free end of this cantilever spring. The other half of the breaker points is fixed to the base of the switch (not shown). This fixed half of the breaker points is then connected via lead 31 to the standard half cell 27. The first switch 16 and the second switch 26 are ganged together by an operating lever 32 having arms 33 and 34 spaced to contact springs 18 and 28 respectively. The operating lever is insulated from the springs and other conductors to isolate the two circuits. This lever may be actuated periodically by hand to open and close the two sets of breaker points but in some cases a cam 35 rotated at a constant rate, forces the lever and springs down.

In operation, after the anode and other apparatus have been installed as indicated, the variable resistor 14 is adjusted so that a very low current, typically about 0.1 ampere as indicated by ammeter 15 is flowing in the conductor-charging circuit with the first or charging circuit switch 16 closed to charge the casing. This flow of charging current is interrupted, preferably periodically, by depressing the switch operating lever 32 to open breaker points 22. Due to the construction of the ganged switches breaker points 30 are closed substantially simultaneously with the opening of breaker points 22. By this means, as the charging current is interrupted, the casing is connected through condenser 24 with the standard half cell 27, which is located greater than about 100 feet, preferably 200–300 feet, from the casing, and the condenser is charged, the charge being proportional to the charge on the casing 10. The resistance of the charge-measuring circuit is desirably low so that the condenser is charged substantially instantaneously as the second or charge-measuring switch 26 is closed. This switch is accordingly closed only momentarily typically less than a second each cycle of the cam 35 and the charging-current switch 16 is closed for substantially the remainder of the cycle which may be from 1 to 10 minutes, preferably 2–4 minutes, typically 3 minutes. After the charge-measuring circuit is opened, i. e., after switch 26 is opened, the charge placed on the condenser 24 is read on voltmeter 25. The internal resistance of the voltmeter and the capacitance of condenser are desirably correlated so that the voltmeter, which may be either indicating or recording, produces a uniform or nonfluctuating response.

After an equilibrium condition has been reached, i. e., after the current-potential relationship has stabilized, the voltmeter and ammeter readings are recorded. The charging current is then increased by small increments, typically 0.1–1 ampere and the stabilized potential at each charging rate is recorded. These data are then recorded on a current versus potential graph as previously disclosed, the break in the curve indicating the amount of current which is just sufficient to protect the casing from corrosion.

From the foregoing it can be seen that this invention is susceptible of a wide variety of embodiments and is not limited to the apparatus specifically described. The invention should therefore be construed to be limited only by the scope of the appended claims.

I claim:

1. An apparatus for measuring the electrical charge on a conductor in contact with the earth and in a state of polarization comprising means including a power supply to place an electric charge on said conductor, a first switch to disconnect said power supply from said conductor, a standard half cell, means including a condenser and a second switch in series to connect said standard half cell to said conductor, means to determine the voltage across said condenser, and gang means to open said first switch and close said second switch substantially simultaneously.

2. An apparatus according to claim 1 including means to vary the output of said power supply.

3. An apparatus according to claim 1 including means to cyclically actuate said gang means to open said first switch and close said second switch.

4. An apparatus according to claim 3 including a rotating cam, said cam being adapted once each cycle to open said first switch and simultaneously to close said second switch momentarily.

5. An apparatus for measuring the charge on an electrical conductor submerged in an electrolyte said charge being measured during a state of polarization of said conductor, comprising a conductor charging circuit, a charge-measuring circuit and means simultaneously to open said charging circuit and to close said charge-measuring circuit, said conductor charging circuit including in series between said electrical conductor and an anode a power source, means to vary the output of said power source, means to measure the output of said power source, and a first switch to break said charging circuit, said charge-measuring circuit including a standard half cell and between said standard half cell and said conductor in series a condenser and a second switch to break said charge-measuring circuit, means to measure the charge on said condenser and means simultaneously to open said first switch and to close said second switch, whereby the charge produced on said conductor by said charging circuit may be measured before said charge decays.

6. An apparatus according to claim 5 including means to cyclically operate said last-named means.

7. An apparatus according to claim 6 in which said last-named means comprises a common operating lever for said first and said second switch and rotating cam means adapted to actuate said lever.

8. An apparatus for measuring the electrical charge on a conductor in contact with the earth and in a state of polarization comprising in combination (1) a conductor charging circuit which includes a source of unidirectional current and means to connect said source between said conductor and the earth surrounding said conductor for polarizing said conductor, (2) a charge-measuring circuit which includes a standard half cell in contact with the earth, a condenser connected in series between said standard half cell and said conductor, and means to measure the voltage across said condenser, and (3) means simultaneously to open said charging circuit and to close said charge-measuring circuit whereby the charge produced on said conductor may be measured before said charge decays.

References Cited in the file of this patent

UNITED STATES PATENTS

| | | |
|---|---|---|
| 1,851,947 | Mirick | Mar. 29, 1932 |
| 2,344,672 | Blasier | Mar. 21, 1944 |
| 2,371,658 | Stewart | Mar. 20, 1945 |